Patented Mar. 15, 1932

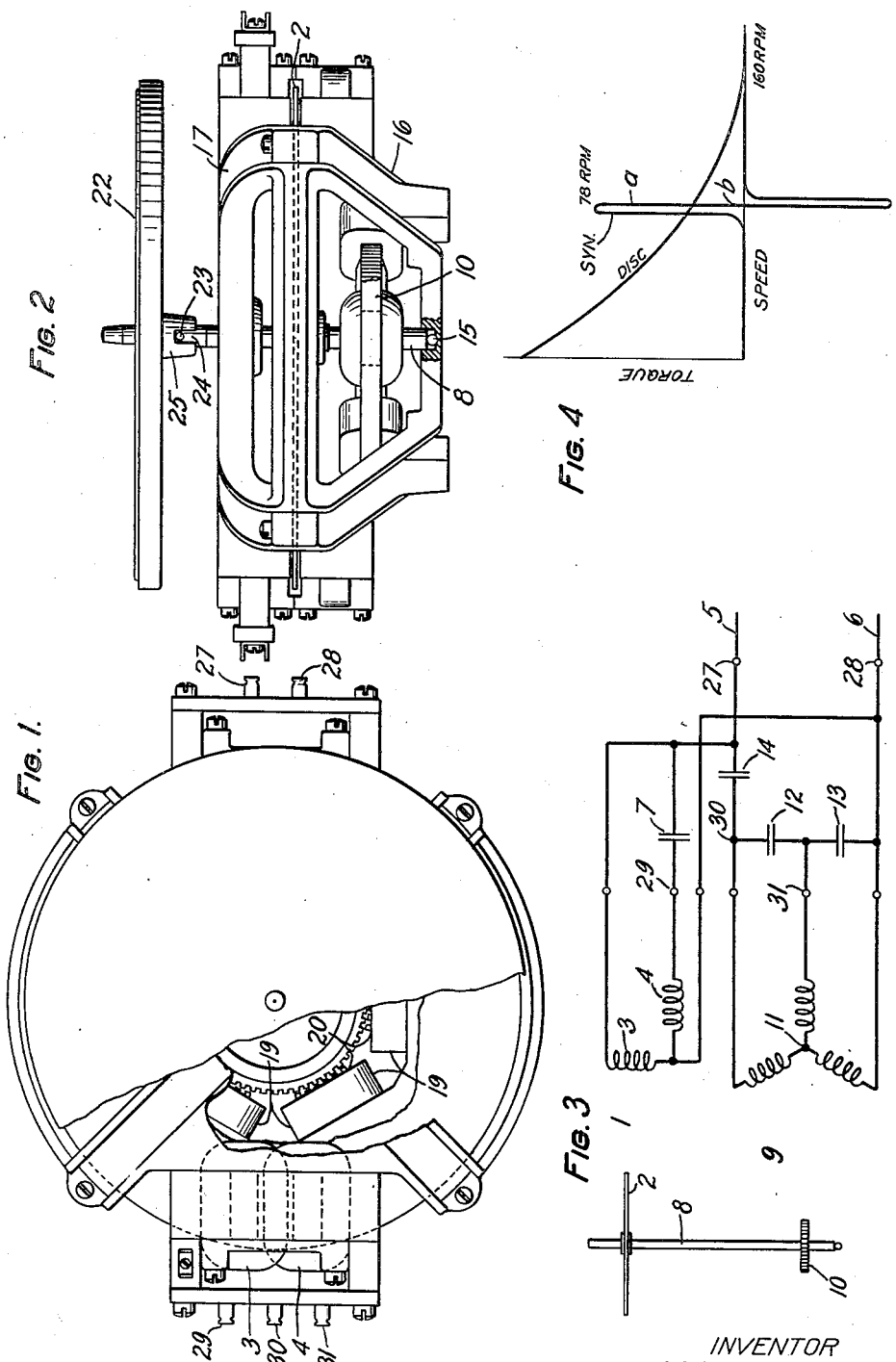

1,849,645

UNITED STATES PATENT OFFICE

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

MOTOR STRUCTURE

Application filed December 31, 1928. Serial No. 329,477.

This invention relates to motor structures operating without hunting action and particularly to motor structures for operating the turntables of phonographs.

One object of the invention is to provide a motor structure that shall develop a high torque not only when starting but also when operating at normal speed and that shall operate without hunting action.

Another object of the invention is to provide a motor developing a high starting torque and operating from a single phase source of current, a second motor operating from a single phase source of current and developing a high running torque, and a load on the two motors for producing a friction damped flywheel effect to limit hunting action.

A further object of the invention is to provide a phonograph with a disc type induction motor operable from a single phase source of current to develop a high torque when starting, an impulse motor operable from a single phase source of current to develop a high running torque, and a lost motion connection between the phonograph turntable and the motors for producing a friction damped flywheel effect to limit hunting action by the motors when starting.

In operating a phonograph by an electric motor it is desirable to effect a quick starting of the turntable and to provide constant speed operation with a high torque when the turntable is being rotated at normal speed. When only alternating current is provided for operating the motor, trouble is experienced in providing a motor having a high starting and running torque which will operate at a substantially constant speed without hunting action. A small alternating current motor which has a good starting torque will generally have a poor speed characteristic when accelerated to normal speed.

In a motor structure constructed in accordance with the invention a disc type induction motor is provided to develop a good starting torque. The induction motor is operated from a single phase source of current and is provided with two exciting coils. One of the coils is directly connected to the single phase source of current and the other coil is connected to the source of current through capacity to change the phase of the supplied current.

A second motor of the impulse type is provided which has the speed characteristics of a synchronous motor. The tooth rotor of the impulse motor is mounted on the shaft, carrying the rotor of the induction motor. The impulse motor is provided with a three phase winding which is supplied with split phase current from a single phase source. Any suitable means may be provided for obtaining split phase current from the single phase source. In the drawings the three phase winding of the impulse motor is shown in circuit with two unequal condensers connected across the single phase source.

Capacity is provided in the single phase leads connected to the impulse motor for tuning the motor circuit to a frequency a little above the frequency of the current received from the single phase source to prevent hunting action when the motor is operating at synchronous speed. The feature of preventing hunting action by inserting capacity in the leads to a synchronous motor is disclosed and claimed in the application of E. R. Morton, Serial No. 181,324, filed April 6, 1927 and which has now become U. S. Patent No. 1,696,248.

The motor structure is disclosed for operating the turntable of a phonograph. The turntable is so connected to the rotor shaft of the motors as to produce a friction damped flywheel effect for limiting hunting action by the motors. Preferably the rotor shaft is connected to the turntable by a pin and slot connection having a limited lost motion. The friction of the lost motion is sufficient to limit the amplitude of the hunting oscillations during starting, and prevents the induction motor from accelerating the synchronous motor through synchronous speed.

In the accompanying drawings Fig. 1 is a plan view of a motor structure constructed in accordance with the invention and having portions broken away to disclose the motor coils.

Fig. 2 is an elevational view of the motor structure shown in Fig. 1.

Fig. 3 is a diagrammatic view showing the circuit connections of the motors included in the motor structure, and Fig. 4 is a view showing the torque-speed curves of the motors.

Referring to Fig. 3 of the drawings, an induction motor 1 is shown comprising a disc rotor 2, and two coils 3 and 4. The coil 3 is directly connected to an A. C. suply circuit comprising conductors 5 and 6. The coil 4 is connected to the supply conductors 5 and 6 through a condenser 7. The condenser 7 serves to change the phase of the current in the coil 4 with respect to the current in coil 3, so that the current in the coil 4 is 90° out of phase with respect to the current flowing through the coil 3. The disc rotor 2 is mounted on a shaft 8.

A synchronous motor 9 of the variable reluctance type is provided with a toothed rotor 10 mounted on the rotor shaft 8 which carries the disc rotor 2 of the induction motor 1. The synchronous motor has a synchronous speed lower than the synchronous speed of the induction motor 2 as shown in Fig. 4 of the drawings. A three phase motor winding 11 is supplied with split phase current from the A. C. supply conductors 5 and 6. Condensers 12 and 13 of different size are provided for splitting the phase of the current supplied to the motor winding. The phase splitting is accomplished in the manner disclosed in the Stienmetz et al. Patent No. 620,988 dated March 14, 1899 and a detailed description thereof is deemed unnecessary. A condenser 14 is provided in the circuit connections to the motor winding 11 in order to tune the motor circuit to a frequency a little above the frequency of the current supplied to the motor for preventing hunting action. The operation of the condenser in preventing hunting action by the synchronous motor is disclosed and claimed in the application of E. R. Morton, Serial No. 181,324.

The induction motor 1 serves to develop a relatively high starting torque and the synchronous motor 9 serves to develop a relatively high torque when the motor is operating at normal speed. The two rotors 2 and 10 of the motors 1 and 9 are mounted on the same shaft 8 so that the motor structure including the two motors will develop a high torque not only when starting but also when operating at normal speed.

Referring to Figs. 1 and 2 of the drawings, the motor structure comprising the induction motor 1 and the synchronous motor 2 will be described in detail. A motor frame comprising a base portion 16 and a top portion 17 carries not only the rotors for the two motors 1 and 9, but also the coils comprising the windings of the motors. The rotor shaft 8, which carries the toothed rotor 10 of the induction motor 9 and the disc rotor 2 of the induction motor 1, is supported in the base portion 16 of the frame by means of a bearing having a single ball 15 as shown in Fig. 2 of the drawings. A bearing is provided in the upper portion 17 of the frame to hold the rotor shaft in alignment with respect to the motor windings. The two coils 3 and 4 of the induction motor 1 are disposed on opposite sides of the disc rotor 2 and are offset vertically with respect to each other. Referring to Fig. 1 of the drawings it will be noted that the coil 3 which is positioned below the disc rotor 2 is not in alignment with the coil 4 which is positioned above the disc rotor 2. Inasmuch as the coil 4 is supplied with current 90° out of phase with respect to the current supplied to the coil 3 and the two coils are not positioned in vertical alignment, it is apparent that a continuous torque will be applied to the disc rotor which will be relatively high at low speed when starting.

The winding 11 of the synchronous motor 9 is embodied in the coils 19 which are carried by toothed pole pieces. The toothed pole pieces are positioned adjacent to the toothed rotor 10 which is mounted on the rotor shaft 8 below the disc rotor 2 of the induction motor. The synchronous motor as hereinbefore set forth serves to develop a relatively high torque when operating at synchronous speed.

The turntable 22 of a phonograph is mounted on and operated by the rotor shaft 8. A limited lost motion is provided in the connection between the turntable 22 and the rotor shaft 8 in order to produce a friction damped flywheel effect for limiting the oscillations of the motors to a small amplitude during starting and assist the condenser 14 in preventing hunting action on the part of the synchronous motor. As shown in Fig. 2 of the drawings the lost motion connection between the turntable 22 and the shaft 8 comprises a pin 23 which is fixably mounted on the rotor shaft at right angles to the axis thereof and a slot 24 formed in the hub 25 of the turntable 22. The slot 24 formed in the hub 25 of the turntable is loosely fitted to the pin 23 in the rotor shaft in order to provide a limited lost motion in the connection between the shaft and the turntable. The friction produced by the lost motion connection serves to waste sufficient energy for maintaining the synchronous motor at substantially normal speed as will be described more fully hereinafter when reference is made to Fig. 4 of the drawings.

The condensers 12 and 13 for splitting the phase of the current supplied to the winding of the synchronous motor, the anti-hunting condenser 14, and the condenser 7 associated with the induction motor 1 are preferably mounted outside the motor frame comprising the parts 16 and 17. The terminals 27 and 28, shown to the right of Fig. 1 of the drawings, are connected to the supply conductors 5 and 6 as indicated in Fig. 3 of the drawings. The three terminals 29, 30 and 31 shown to the left of Fig. 1 of the drawings are connected to the two motor windings as indicated in Fig. 3 of the drawings.

Referring to Fig. 4 of the drawings, curves are shown to illustrate the torque developed by the two motors 1 and 2 at different speeds. The curve marked "Disc" indicates the torque developed by the induction motor 1 at different speeds and the curve marked "Syn" indicates a torque developed by the synchronous motor 9 at different speeds. When starting the operation of the motor structure, it will be noted the induction motor develops a very high torque whereas the synchronous motor develops no torque at all.

Assuming synchronous speed of the motor 9 to be in the region of 78 R. P. M. of the turntable, it will be noted the torque developed by the induction motor drops rapidly as synchronous speed is approached. When the synchronous speed of the synchronous motor is reached, a sudden increase in the torque developed by the motor structure is effected. The motor structure continues to accelerate until the synchronous motor 9 is operating on the portion $a$ of the torque curve "Syn" shown in Fig. 4 of the drawings. The torque developed by the two motors rapidly decreases at this point in the operation as the speed increases. At the point $b$ on the speed torque curve of the synchronizing motor, no torque is developed by the motor. Beyond the point $b$ the synchronous motor develops a negative torque and opposes the action of the induction motor. The opposition produced by the synchronous motor stops the acceleration operation and for a brief period the motors will have an oscillatory operation. During this oscillatory operation the frictional loss effected by the lost motion connection between the turntable and the rotor shaft soon brings the motor structure to a stable operating speed. In this manner the lost motion connection between the turntable and the rotor shafts produces a friction damped flywheel effect to limit the oscillations of the motors and thus assist the condenser 14 in preventing hunting action by the synchronous motor.

In the above described motor structure it will be noted the induction motor 1 provides a good starting torque for operating the turntable. The synchronous motor 9 provides not only a good running torque but a means for holding the rotation of the turntable at a fixed speed. Phase adjusting and phase splitting means is provided for the motors whereby each motor is operated from a single phase source. Means are also provided to insure against any hunting action on the part of the synchronous motor. A friction damped flywheel effect is produced by providing a lost motion action between the rotor shaft of the motors and the turntable of the phonograph. The limited lost action in the connection between the turntable and the rotor shaft provides sufficient friction for insuring against accelerating the synchronous motor through synchronous speed.

Modifications in the structure and in the arrangement and location of parts may be made within the spirit and scope of the invention and such modifications are intended to be covered by the appended claims.

What is claimed is:

1. In a motor structure, a motor having a relatively high synchronous speed and developing a high starting torque and a low running torque, a second motor of the synchronous type mechanically connected to and operating with said first mentioned motor and having a relatively low synchronous speed, said second motor developing a low starting torque and a high running torque, a phonograph turntable having a relatively large moment of inertia and operated by said motors, and a lost motion connection between the turntable and said motors for producing a friction damped flywheel effect to prevent operating the synchronous motor above synchronous speed during starting.

2. In a motor structure, a disc type induction motor operable from a single phase source of current, a synchronous motor supplied with current from a single phase source, having a synchronous speed lower than the synchronous speed of said induction motor and directly connected to said induction motor, means for preventing hunting action by the synchronous motor, a load carried by the rotor shaft of said motors having in combination with the rotor disk of the induction motor a relatively high moment of inertia when compared with the starting torque of the motors, and means connecting said load to the rotor shaft of said motors for producing a friction damped flywheel effect to assist in synchronizing the synchronous motor.

3. In a motor structure, an induction motor having a disc rotor and two coils for operating the rotor, said induction motor having a relatively high synchronous speed, one said coil being directly connected to a single phase supply circuit and the other coil being connected to the supply circuit by a capacity element, a synchronous motor connected to said induction motor and having a toothed rotor and a three phase winding, phase-splitting means for connecting said three phase winding to a single phase source of supply, said synchronous motor having a relatively low synchronous speed, a phonograph turntable, and a limited lost motion connection between the turntable and the shaft carrying said rotors for assisting in synchronizing the synchronous motor.

4. In a motor structure, an induction motor developing a high starting torque, a synchronous motor developing a high running torque and having a synchronous speed lower than the synchronous speed of said induction motor, a phonograph turntable operated by said motors, said turntable having a relatively high moment of inertia when compared with the starting torque of the motors and a frictional connection between the turntable and the rotors of said motors for producing a friction damped flywheel effect to prevent operating the synchronous motor above synchronous speed during starting.

5. In a motor structure for operating a phonograph, a motor developing a high starting torque and having a relatively high synchronous speed, a second motor operating as a synchronous motor having a relatively low synchronous speed and directly connected to said first mentioned motor, said second motor developing a low starting torque and a high running torque, a phonograph turntable having a relatively high moment of inertia when compared with the starting torque of the structure and operated by said motors, and a pin and slot connection between said turntable and the rotor shaft of said motors, said connection providing a limited frictional connection between the motors and the turntable for producing a friction damped flywheel effect to assist in synchronizing the second motor.

6. In a motor structure, an induction motor developing a high starting torque and operated from a single phase source of current, a synchronous motor having a synchronous speed lower than the synchronous speed of the induction motor, developing a high running torque and operated from a single phase source of current, means for preventing hunting action by the synchronous motor, a phonograph turntable having a high moment of inertia when compared with the starting torque of the induction motor and operated by said motors, and a limited lost motion connection between the turntable and said motors for producing a friction damped flywheel effect to prevent the synchronous motor being operated above synchronous speed during starting.

7. In a motor structure, an induction motor developing a high starting torque and operated from a single phase source of current, a synchronous motor developing a high running torque and operated from a single phase source of current, said induction motor having a synchronous speed higher than the synchronous speed of the synchronous motor, a phonograph turntable operated by the rotor shaft of said motors, said turntable having a relatively high moment of inertia when compared with the starting torques of the motors, and a pin and slot connection between the rotor shaft and the turntable, said connection having a limited lost motion for producing a friction damped flywheel effect to assist in synchronizing the synchronous motor during starting.

In witness whereof, I hereunto subscribe my name this 27th day of December, 1928.

HUGH M. STOLLER.